(12) United States Patent
Morita et al.

(10) Patent No.: US 11,912,157 B2
(45) Date of Patent: Feb. 27, 2024

(54) DRIVING CONTROL DEVICE AND DRIVING SYSTEM FOR VEHICLE

(71) Applicant: DENSO CORPORATION, Kariya (JP)

(72) Inventors: Yoshinori Morita, Kariya (JP); Shingo Kawahara, Kariya (JP)

(73) Assignee: DENSO CORPORATION, Kariya (JP)

( * ) Notice: Subject to any disclaimer, the term of this patent is extended or adjusted under 35 U.S.C. 154(b) by 393 days.

(21) Appl. No.: 17/391,183

(22) Filed: Aug. 2, 2021

(65) Prior Publication Data

US 2021/0354586 A1 Nov. 18, 2021

Related U.S. Application Data

(63) Continuation of application No. PCT/JP2020/003232, filed on Jan. 29, 2020.

(30) Foreign Application Priority Data

Feb. 8, 2019 (JP) .................................. 2019-022102

(51) Int. Cl.
| | |
|---|---|
| *B60L 1/00* | (2006.01) |
| *B60L 58/12* | (2019.01) |
| *B60L 53/20* | (2019.01) |
| *B60L 3/00* | (2019.01) |

(Continued)

(52) U.S. Cl.
CPC ................. *B60L 58/12* (2019.02); *B60L 1/00* (2013.01); *B60L 3/0046* (2013.01); *B60L 15/20* (2013.01); *B60L 53/20* (2019.02); *H01M 10/48* (2013.01); *B60L 2240/547* (2013.01); *B60L 2240/549* (2013.01)

(58) Field of Classification Search
CPC .. B60L 58/12; B60L 53/20; B60L 1/00; B60L 3/0046; B60L 15/20; B60L 2240/547; B60L 2240/549; H01M 10/48
See application file for complete search history.

(56) References Cited

U.S. PATENT DOCUMENTS

| | | | |
|---|---|---|---|
| 2017/0274775 A1 | 9/2017 | Kamata | |
| 2017/0274784 A1 | 9/2017 | Nagakura et al. | |

FOREIGN PATENT DOCUMENTS

| | | | |
|---|---|---|---|
| JP | 2007-18871 A | 1/2007 | |
| JP | 2010-203790 A | 9/2010 | |

(Continued)

OTHER PUBLICATIONS

Apr. 28, 2020 International Search Report issued in International Patent Application No. PCT/JP2020/003232.

*Primary Examiner* — Mathew Franklin Gordon
(74) *Attorney, Agent, or Firm* — Oliff PLC

(57) ABSTRACT

In a driving control device that controls a driving system for a vehicle, a voltage monitoring unit determines an abnormality in voltage detection and a current monitoring unit determines that power is supplied to the battery when a battery has a current value on a charge side relative to a predetermined value. When the voltage monitoring unit determines that the voltage detection is abnormal, a running control unit controls a rotating electric machine in such a manner that the vehicle is brought in a fail-safe running state. A power supply control unit controls a power supply source to be in a power supply prohibition state. A switch control unit cuts off a switch, in a case where it is determined that power is supplied to the battery during the power supply prohibition state of the power supply source.

14 Claims, 9 Drawing Sheets

(51) Int. Cl.
*B60L 15/20* (2006.01)
*H01M 10/48* (2006.01)

(56) References Cited

FOREIGN PATENT DOCUMENTS

| | | |
|---|---|---|
| JP | 2012-130154 A | 7/2012 |
| JP | 2017-135954 A | 8/2017 |

DRIVING CONTROL DEVICE AND DRIVING SYSTEM FOR VEHICLE

CROSS-REFERENCE TO RELATED APPLICATION

This application is based on and claims the benefit of priority from earlier Japanese Patent Application No. 2019-022102 filed Feb. 8, 2019, the description of which is incorporated herein by reference.

BACKGROUND

Technical Field

The present disclosure relates to a driving control device that controls a driving system for a vehicle which includes a rotating electric machine capable of driving the vehicle by power supplied from a battery.

Related Art

A driving system is known, in which power is supplied to a rotating electric machine from a secondary battery as a battery and the rotating electric machine is used to drive a vehicle. In this driving system, when a voltage detection circuit that detects a voltage of the battery cannot detect a cell voltage normally, due to disconnection, circuit failure or the like, charging of the battery is prohibited or suppressed. This suppresses overcharging of the battery.

DESCRIPTION OF SPECIFIC EMBODIMENTS

Figure 1:
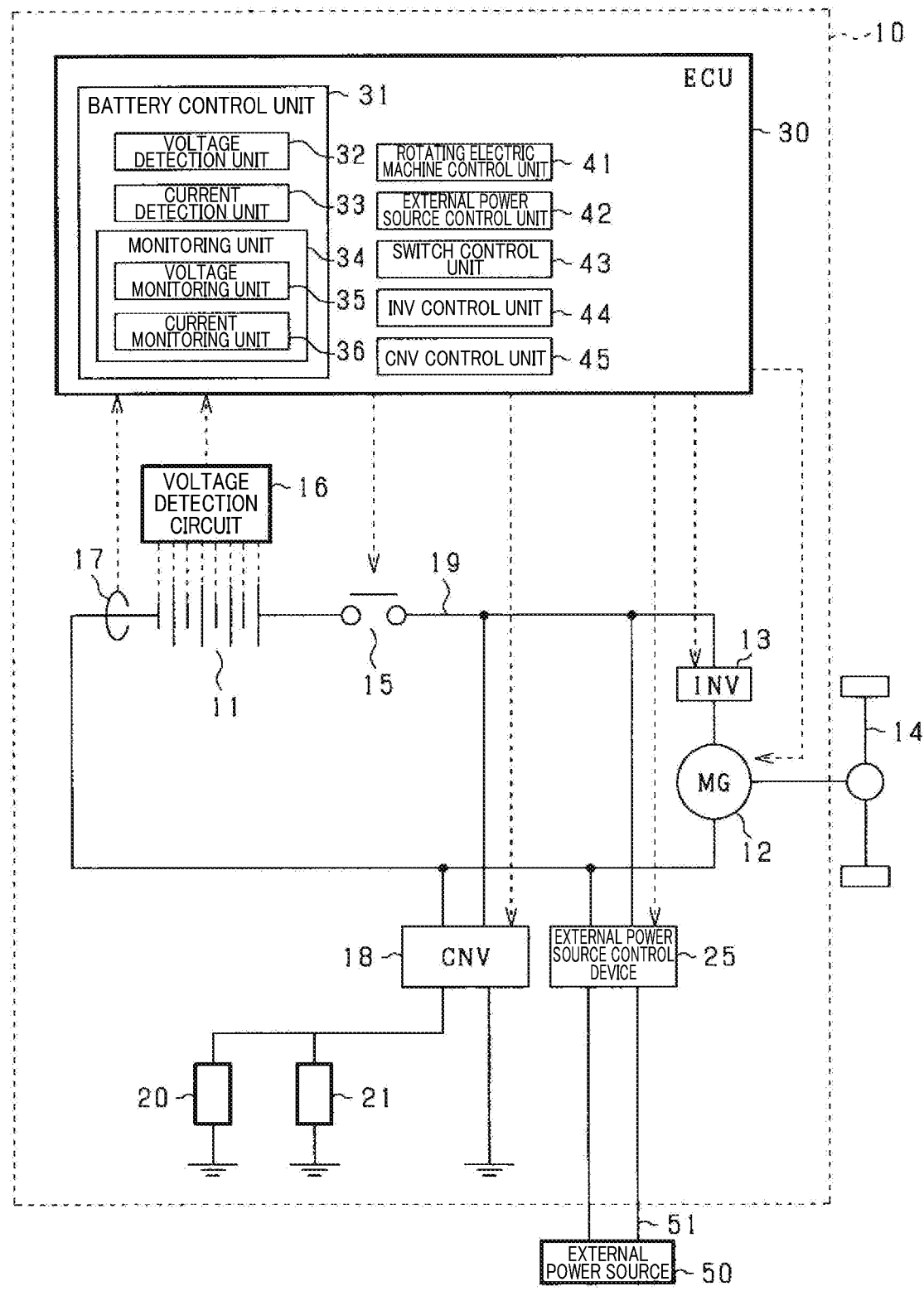
FIG. 1 is a diagram showing a driving system for a vehicle according to a first embodiment.

In the above known driving system, as disclosed in JP-A-2007-18871, if the voltage detection circuit that detects the voltage of the battery breaks down while the vehicle is running, it is preferable to run the vehicle fail-safely while quickly decelerating the vehicle, and to stop the vehicle at a safe place. During fail-safe running, the rotating electric machine is powered, in a state where the power supply from a power supply source to the battery is prohibited, to run the vehicle, so that the power of the battery can be consumed and that the overcharging of the battery can be suppressed. However, if the power supply source is not properly controlled and erroneously supplies power to the battery, a risk may arise that the battery will become overcharged during fail-safe running.

In view of the foregoing, it is desired to have a technique capable of performing fail-safe running of a vehicle while avoiding overcharging of a battery when an abnormality occurs in detection of the battery voltage.

One aspect of the present disclosure provides a driving control device for controlling a driving system for a vehicle, the driving system including: a battery; a rotating electric machine that drives the vehicle by power supplied from the battery; and a switch that switches an electrical connection state between the battery and a power supply source that supplies power to the battery to a conductive state or a cutoff state. The driving control device includes: a battery control unit that controls the battery; a running control unit that controls a running state of the vehicle; a power supply control unit that controls the power supply source; and a switch control unit that controls the switch. The battery control unit includes: a voltage detection unit that acquires a voltage value of the battery as a battery voltage value; a current detection unit that acquires a charge/discharge current value of the battery as a battery current value; a voltage monitoring unit that determines an abnormality in the battery voltage value; and a current monitoring unit that determines that power is supplied to the battery when the battery current value is on a charge side relative to a predetermined current threshold value. The running control unit controls the rotating electric machine in such a manner that the vehicle is brought in a fail-safe running state when the voltage monitoring unit determines that the voltage detection is abnormal. When the voltage monitoring unit determines that the voltage detection is abnormal, the power supply control unit controls the power supply source to be in a power supply prohibition state in which power supply to the battery is prohibited. The switch control unit cuts off the switch, in a case where the current monitoring unit determines that power is supplied to the battery when the power supply source is controlled to be in the power supply prohibition state.

According to the aspect of the present disclosure, the battery control unit that controls the battery includes a monitoring unit including a voltage monitoring unit and a current monitoring unit. The voltage monitoring unit determines an abnormality in voltage detection based on the battery voltage value. When it is determined that the voltage detection is abnormal, the running control unit controls the rotating electric machine in such a manner that the vehicle is brought in a fail-safe running state, and the power supply control unit controls the power supply source to be in a power supply prohibition state in which the power supply to the battery is prohibited. Thus, when it is determined that the voltage detection is abnormal, fail-safe running of the vehicle can be performed in a state where the power supply to the battery is prohibited. On the other hand, the current monitoring unit determines that power is supplied to the battery when the battery current value is on a charge side relative to a predetermined current threshold value. In a case where it is determined that power is supplied to the battery when the power supply source is controlled to be in the power supply prohibition state (hereinafter, sometimes referred to as "during the power supply prohibition state"), the switch control unit cuts off the switch. Thus, in a case where power is erroneously supplied to the battery during the power supply prohibition state of the power supply source, the switch can be cut off. Therefore, overcharging of the battery can be avoided. That is, according to the driving control device according to the present disclosure, when an abnormality occurs in the voltage detection of the battery, it is possible to perform fail-safe running of the vehicle while avoiding overcharging of the battery.

First Embodiment

FIG. 1 shows a driving system 10 for a vehicle according to the present embodiment. The driving system 10 is mounted on a vehicle that is an electric vehicle (EV vehicle) and can drive wheels 14 of the vehicle. The driving system 10 includes a battery 11, a rotating electric machine 12 that is a high-voltage load, an inverter 13, a switch 15, a voltage detection circuit 16, a current detection device 17, a converter 18, an external power source control device 25, low-voltage loads 20 and 21, and an electronic control unit (ECU) 30.

The battery 11 is a secondary battery, and, more specifically, for example, a lithium ion storage battery having an output voltage of about 200 to 300 V. In the present embodiment, the battery 11 is an assembled battery including a series connection body of a plurality of cells (single cells).

The rotating electric machine 12 converts the rotational energy of the wheels 14 into power when operating as a generator, and converts the power supplied from the battery 11 into rotational energy when operating as an electric motor. The rotating electric machine 12 is sometimes referred to as a motor generator (MG).

The inverter 13 is connected between the switch 15 and the rotating electric machine 12 on wiring 19 that connects the battery 11 and the rotating electric machine 12. When the rotating electric machine 12 operates as a generator, the inverter 13 can convert the generated AC power into DC power and store the DC power in the battery 11. When the rotating electric machine 12 operates as an electric motor, the inverter 13 can convert the DC power output from the battery 11 into AC power to operate the rotating electric machine 12.

The switch 15 is installed on the wiring 19 that connects the battery 11 and the rotating electric machine 12. By switching the switch 15, the connection/disconnection of the wiring 19 can be switched. When the switch 15 is in a connection state, the battery 11 and the rotating electric machine 12 are electrically connected. When the switch 15 is in a cutoff state, the battery 11 and the rotating electric machine 12 are not electrically connected.

The voltage detection circuit 16 is a voltage detection circuit connected to each cell of the battery 11 which is a secondary battery, and can detect a voltage value of each cell. The current detection device 17 can detect charge/discharge current of the battery 11, and can change a current detection range. The current detection range preferably includes at least two ranges, i.e., "wide range" and "narrow range", and three or more current detection ranges may be set.

The converter 18 is a DC-DC converter. The converter 18 is connected between the battery 11 and the switch 15 and the rotating electric machine 12 and the inverter 13, and is connected to the low-voltage loads 20 and 21. The converter 18 is connected between a high-voltage side (side of the battery 11 and the inverter 13) and a low-voltage side (side of the low voltage loads 20 and 21). The converter 18 steps down the power input from the high-voltage side and outputs the power to the low-voltage side. Further, the converter 18 boosts the power input from the low-voltage side and outputs the power to the high-voltage side.

The low-voltage loads 20 and 21 are auxiliary machines that are operated by relatively low-voltage power supplied from the converter 18, and are composed of instruments that operate at a relatively low voltage of about 12 V.

The external power source control device 25 is a device that controls delivery of power between the battery 11 and an external power source 50 of the vehicle. The external power source 50 is, for example, a charger installed in a charge stand or the like, and is connected to the vehicle with a charge cable, and thus can charge the battery 11. The external power source control device 25 is connected between the battery 11 and the switch 15 and the rotating electric machine 12 and the inverter 13, and is also connected to a power cable 51 that connects the external power source 50.

The ECU 30 is a driving control device that controls each of the components of the driving system 10 such as the battery 11, the rotating electric machine 12, the inverter 13, the converter 18, and the external power source control device 25. The ECU 30 includes a battery control unit 31 that controls the battery 11, a rotating electric machine control unit 41 that controls the rotating electric machine 12, an external power source control unit 42 that controls the external power source control device 25, and a switch control unit 43 that controls the switch 15, an inverter control unit 44 that controls the inverter 13, and a converter control unit 45 that controls the converter 18. The ECU 30 is mainly composed of a microcomputer including a CPU, a ROM, a RAM, a backup RAM, I/O, and the like (none of which is shown), and executes various control programs stored in the ROM, so that the functions of the respective control units described herein can be realized.

The battery control unit 31 can perform processing of controlling the charge/discharge power of the battery 11. The battery control unit 31 includes a monitoring unit 34, a voltage detection unit 32, and a current detection unit 33. The monitoring unit 34 includes a voltage monitoring unit 35 and a current monitoring unit 36.

The voltage detection unit 32 acquires a voltage value of the battery 11 detected by the voltage detection circuit 16 as a battery voltage value VB. The current detection unit 33 acquires a charge/discharge current value of the battery 11 detected by the current detection device 17 as a battery current value IB. The current detection unit 33 may be configured so that an offset error of the current detection system can be corrected for, for example, when the vehicle is stopped.

In the present specification, a positive battery current value IB indicates a charge current to the battery 11, and a negative battery current value IB indicates a discharge current from the battery 11. It can be said that a larger battery current value IB is on a farther charge side, and that a smaller battery current value IB is on a farther discharge side.

The monitoring unit 34 includes a voltage monitoring unit 35 that monitors the battery voltage value VB and a current monitoring unit 36 that monitors the battery current value IB. The voltage monitoring unit 35 monitors the battery voltage value VB and determines a detection abnormality, that is, an abnormality in voltage detection system of the battery 11, based on the battery voltage value VB. The detection abnormality means a state in which the voltage of the battery 11 cannot be detected normally, for example, due to a failure of the detection circuit in the voltage detection circuit 16, a disconnection of the wiring between the voltage detection circuit 16 and the battery 11, a communication abnormality between the ECU 30 and the voltage detection circuit 16, and the like.

The current monitoring unit 36 determines that power is supplied to the battery 11 when the battery current value IB is on a charge side relative to a predetermined current threshold value. When a positive battery current value IB indicates a charge current to the battery 11 and a negative battery current value IB indicates a discharge current from the battery 11 as in the present specification, the sentence that "when the battery current value IB is on a charge side relative to a predetermined current threshold value" means "when the battery current value IB is equal to or larger than a predetermined current threshold value". Conversely, when a negative battery current value IB indicates a charge current to the battery 11 and a positive battery current value IB indicates a discharge current, the sentence that "when the battery current value IB is on a charge side relative to a predetermined current threshold value" means "when the battery current value IB is equal to or smaller than a predetermined current threshold value".

The current monitoring unit 36 may be configured to monitor the battery current value IB only when the power supply to the battery 11 is prohibited, or may be configured to monitor the battery current value IB regardless of a command to supply power to the battery 11.

The current monitoring unit 36 may be configured to immediately determine that power is supplied to the battery 11 when it is determined that the battery current value IB is equal to or larger than the predetermined current threshold value. On the other hand, the current monitoring unit 36 may be configured not to determine that power is supplied to the battery 11, until a time during which the battery current value IB is equal to or larger than the predetermined current threshold value becomes equal to or longer than a predetermined determination time, even when the battery current value IB is equal to or larger than the predetermined current threshold value. That is, the current monitoring unit 36 may be configured to determine that power is supplied to the battery 11 in a case where the time during which the battery current value IB is determined to be equal to or larger than the predetermined current threshold value becomes equal to or longer than the predetermined determination time. The determination time may be compared with, for example, a cumulative total of times during which the battery current value IB is equal to or larger than the predetermined current threshold value. Further, the determination time may be compared with, for example, a counter value C that increments when the battery current value IB is determined to be equal to or larger than the predetermined current threshold value.

In the current monitoring unit 36, the current threshold value is preferably set to a current value such that the actual current flowing through the wiring 19 is zero or a value close to zero, in consideration of the detection accuracy of the current detection device 17 and the like. For example, when the current detection device 17 can detect the current with high accuracy and one current threshold value is set, the current threshold value may be set to zero.

The current monitoring unit 36 may be configured to set a plurality of current threshold values for determining that power is supplied to the battery 11. When a plurality of current threshold values are set, the determination time may be set for each current threshold value.

For example, a first current threshold value IL and a second current threshold value IH larger than the first current threshold value IL (which is a value on a farther charge side) may be set, a first determination time Xc1 may be set for the first current threshold value IL, and a second determination time Xc2 may be set for the second current threshold value IH. Then, when the battery current value becomes equal to or larger than the first current threshold value IL, the first counter value C1 is incremented or counted up, and, when the first counter value C1 becomes equal to or larger than the first determination time Xc1, it is determined that power is supplied to the battery 11. Further, when the battery current value IB becomes equal to or larger than the second current threshold value IH, the second counter value C2 is incremented, and, when the second counter value C2 becomes equal to or larger than the second determination time Xc2, it is determined that power is supplied to the battery 11.

When increment amounts of the first counter value C1 and the second counter value C2 are equalized (for example, when the counter values are incremented by 1), the first determination time Xc1 is preferably set to be longer than the second determination time Xc2. That is, it is preferable to set a longer determination time as the current threshold value is smaller. Instead of this, the first determination time Xc1 and the second determination time Xc2 may be set to the same time, and the increment amount of the second counter value C2 may be made larger than the increment amount of the first counter value C1. Specifically, for example, when the battery current value IB becomes equal to or larger than the first current threshold value IL, the first counter value C1 may be incremented by 1, and, when the battery current value IB becomes equal to or larger than the second current threshold IH, the second counter value C2 may be incremented by 2.

The determination time is preferably set to a value at which the switch 15 can be cut off so that an allowable capacity W of the battery 11 is not exceeded, based on the current threshold value and the allowable capacity W for overcharging of the battery 11. The allowable capacity W is a difference between a capacity of the battery 11 during overcharge and a current capacity thereof, or a preset difference between the capacity during overcharge and a capacity during full charge within a normal use range. If the battery 11 is further charged beyond the allowable capacity W from the current state, the battery 11 may be overcharged. Specifically, it is preferable to calculate a maximum current value (assumed maximum current) Imax assumed as the battery current value IB based on the current threshold value, and to calculate the determination time Xc based on the following formula (1).

$$Xc = W/I\max \quad (1)$$

For example, when calculating the first determination time Xc1 corresponding to the first current threshold value IL, it is preferable to calculate the assumed maximum current Imax in consideration of a detection error. Specifically, when the detection error is ±dI, the current range is in the range from (Ig−dI) to (Ig+dI). Therefore, the assumed maximum current Imax=(Ig+dI).

Further, for example, when calculating the second determination time Xc2 corresponding to the second current threshold value IH, it is preferable to use the maximum current value that can be supplied by the power supply source as the assumed maximum current Imax. Specifically, a maximum generated current of the rotating electric machine 12 may be used as the assumed maximum current Imax.

When the voltage monitoring unit 35 determines that the voltage detection is abnormal, the rotating electric machine control unit 41 controls the rotating electric machine 12 so that the vehicle is in the fail-safe running state and that power is not supplied from the rotating electric machine 12 to the battery 11. Further, the external power source control unit 42 controls the external power source control device 25 so as not to supply power to the battery 11 even when the vehicle is connected to the external power source 50. As a result, the vehicle can be run fail-safely in the state where the power supply to the battery 11 is prohibited.

The rotating electric machine control unit 41 can control the rotating electric machine 12 to control its power running operation and regenerative operation. The rotating electric machine control unit 41 functions as a running control unit that controls a running state of the vehicle, when performing the power running operation of the rotating electric machine 12, and functions as a power supply control unit that controls the power supply source that supplies power to the battery 11, when regeneratively operating the rotating electric machine 12.

When the voltage monitoring unit 35 determines that the voltage detection is abnormal, the rotating electric machine control unit 41 may be configured to prohibit the power generation by the rotating electric machine 12 to prohibit the power supply to the battery 11, and to control the rotating electric machine 12 so that vehicle is in the fail-safe running state.

The external power source control unit 42 functions as the power supply control unit that controls the power supply source that supplies power to the battery 11. The external power source control unit 42 may also be able to control the discharge from the battery 11 to the external power source 50. The external power source control unit 42 controls the external power source control device 25 so as to prohibit the power supply from the external power source 50 to the battery 11 during the power supply prohibition state.

The switch control unit 43 cuts off the switch 15 based on the determination result of the current monitoring unit 36 when the power supply from the rotating electric machine 12 and the external power source 50 to the battery 11 is prohibited. That is, when the current monitoring unit 36 determines that power is supplied to the battery 11, the switch 15 is cut off. Thus, the switch 15 can be cut off, when power is erroneously supplied to the battery 11 despite the fact that the power supply source is in the power supply prohibition state. By cutting off the switch 15, power distribution in the wiring 19 is cut off, and the charge current to the battery 11 is cut off. When the switch 15 is cut off, the discharge current from the battery 11 is also cut off.

The inverter control unit 44 can control the inverter 13 to convert the AC power generated by the rotating electric machine 12 into DC power. Further, the inverter 13 can convert the DC power output from the battery 11 into AC power.

By controlling the converter 18, the converter control unit 45 can control the delivery of power between the battery 11 and the low-voltage loads 20 and 21. The converter control unit 45 may be configured to increase the operating time of the converter 18 to increase the power consumption during fail-safe running. Further, when increasing the power consumption of the converter 18, the converter control unit 45 may be configured to increase the power consumption of the low-voltage loads 20 and 21 as compared with a normal time.

Figure 2:
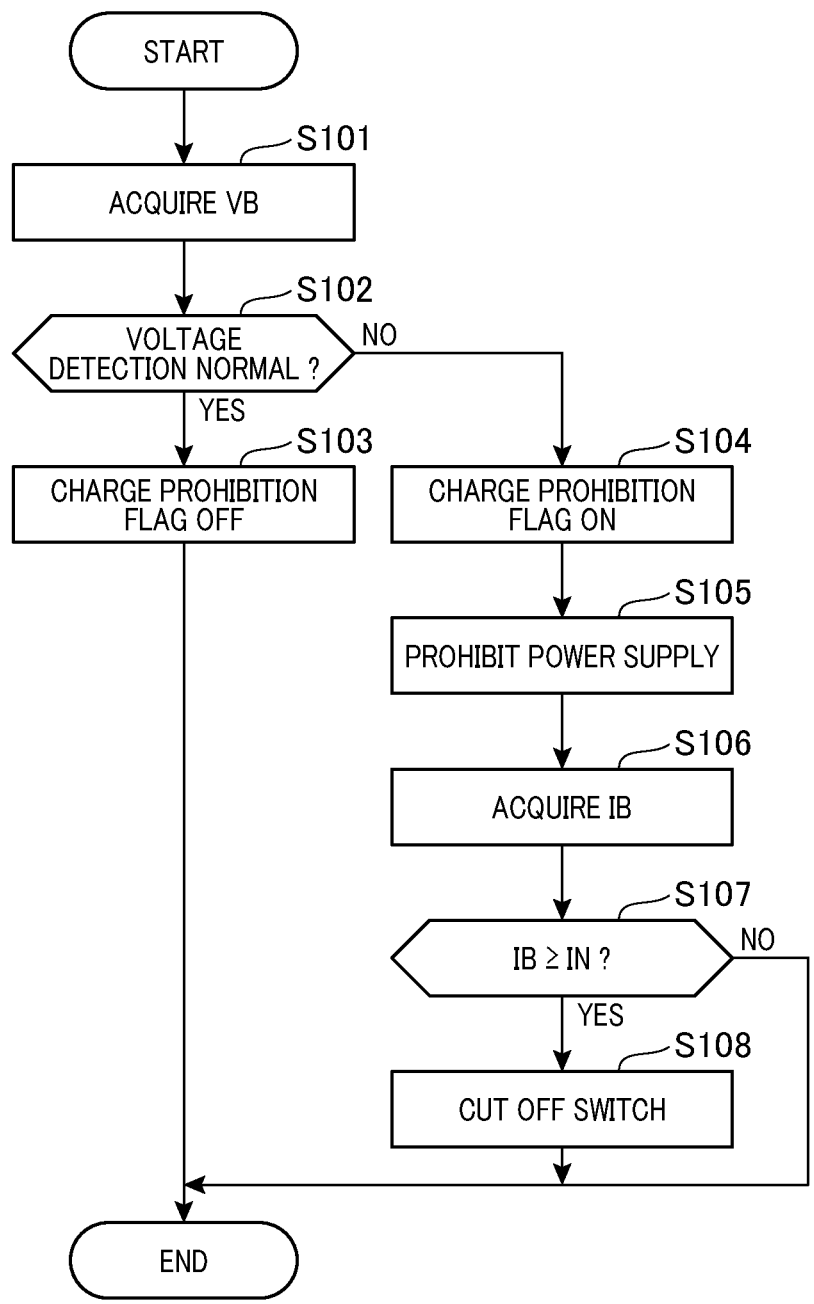
FIG. 2 is a flowchart of vehicle driving control according to the first embodiment.

FIG. 2 shows a flowchart of vehicle driving control performed by the ECU 30. The processing related to this flowchart is repeatedly performed at a predetermined cycle.

In step S101, the battery voltage value VB is acquired, and the process proceeds to step S102. In step S102, it is determined whether the voltage detection is normal based on the acquired battery voltage value VB. For example, when the acquired battery voltage value VB is as small as near zero or when the acquired battery voltage value VB is large beyond the voltage detection range, it is determined that the voltage detection is abnormal (not normal).

Further, a charge prohibition flag is switched on and off based on the determination result as to whether the voltage detection is normal. Here, the charge prohibition flag is a flag of prohibiting the power supply to the battery 11. When the charge prohibition flag is on, the power supply sources (rotating electric machine 12 and the external power source control device 25) are controlled so as to be brought in a state where the power supply to the battery 11 is prohibited. When the voltage detection is normal in step S102, the process proceeds to step S103, in which the charge prohibition flag is switched off, and then the process ends. On the other hand, when the voltage detection is abnormal, the process proceeds to step S104. In step S104, the charge prohibition flag is switched on, and the process proceeds to step S105.

In step S105, power supply prohibition processing is performed. Specifically, processing of prohibiting the power supply from the rotating electric machine 12 to the battery 11 and prohibiting the power supply from the external power source 50 is performed. More specifically, a control to prohibit power generation is performed on the rotating electric machine 12, and a control to prohibit charge from the external power source 50 is performed on the external power source control device 25.

In step S106, after acquisition of the battery current value IB, the process proceeds to step S107. In step S107, it is determined whether the battery current value IB is equal to or larger than the current threshold value IN. This determination is processing of determining whether power is supplied to the battery 11, and the current threshold IN is set to, for example, zero or a value near zero. When IB≥IN, the process proceeds to step S108, in which a control to cut off the switch 15 is performed, and then the process ends. When IB<IN, the process ends without cutting off the switch 15. In step S107, when it is determined that IB≥IN, it may be immediately determined that power is supplied to the battery 11. Or, when a time during which it is determined that IB≥IN is equal to or longer than a predetermined determination time, it may be determined that power is supplied to the battery 11.

As described above, according to the ECU 30, when it is determined, by the processing in steps S101 to S105, that there is an abnormality in voltage detection system including the voltage detection circuit 16 and the voltage detection unit 32, the charge prohibition flag is switched on, and the processing of prohibiting the power supply to the battery 11 can be performed.

Further, when the charge prohibition flag is switched on by the processing in steps S104 to S108, i.e., during the power supply prohibition state of the power supply source, the switch 15 can be cut off on condition that it is determined that power is supplied to the battery 11.

Second Embodiment

Figure 3:
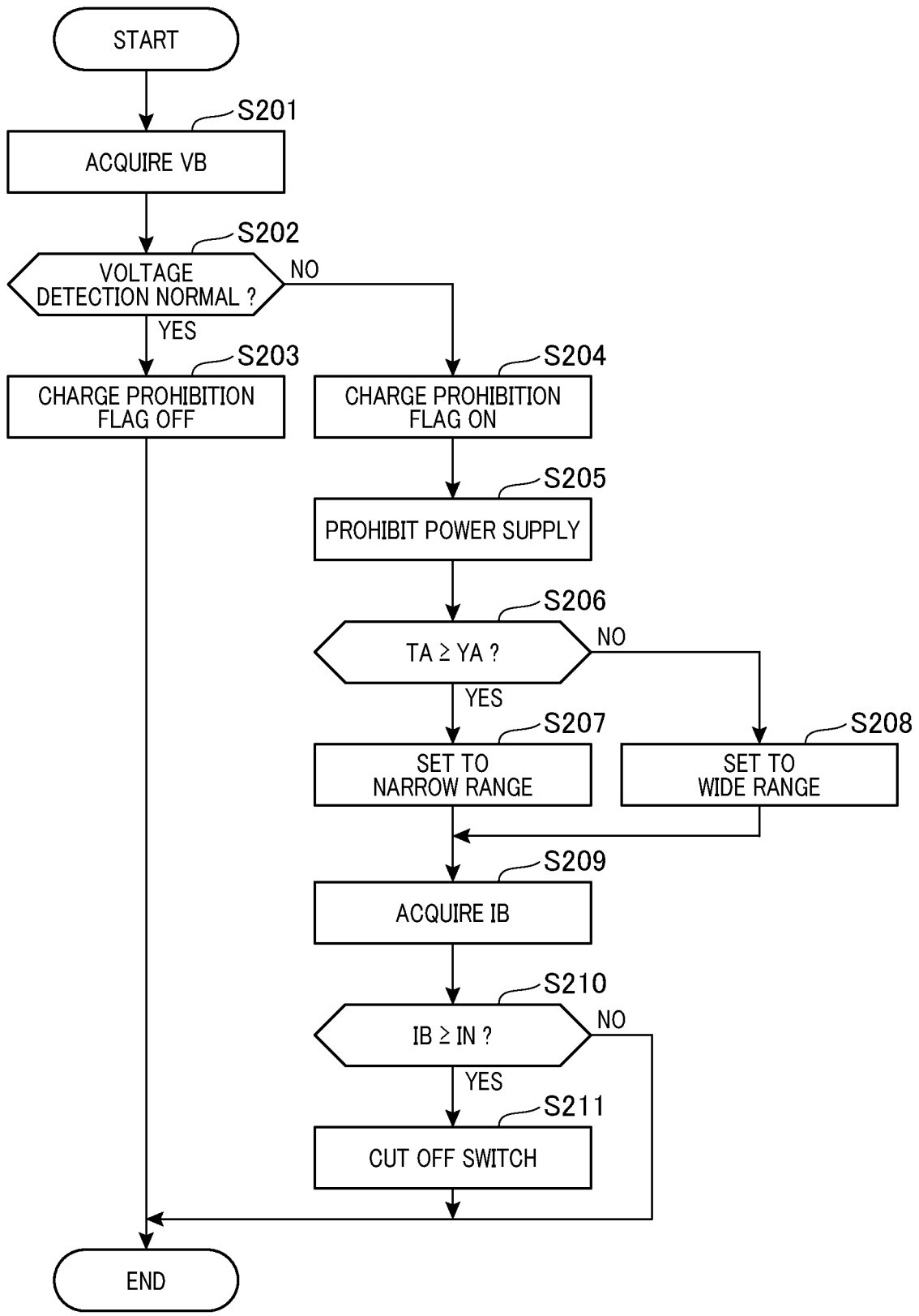
FIG. 3 is a flowchart of vehicle driving control according to a second embodiment.

FIG. 3 is a flowchart of vehicle driving control according to a second embodiment. The processing related to this flowchart is repeatedly performed at a predetermined cycle. In FIG. 3, the current detection range of the battery current value IB is set to the "wide range" or the "narrow range" by the processing shown in steps S206 to S208. Further, as shown in steps S209 to S211, the battery current is monitored regardless of the presence or absence of an abnormality in detection of the battery voltage value VB. Since the processing in steps S201 to S205 and S209 to S211 is the same as that in steps S101 to S108 shown in FIG. 2, the description thereof will be omitted.

After the power supply prohibition processing is performed in step S205, the process proceeds to step S206. In step S206, it is determined whether a prohibition time TA, which is an elapsed time from a time point when the power supply prohibition processing is performed, is equal to or larger than a predetermined threshold value YA. For example, when the control to prohibit power generation is performed on the rotating electric machine 12, an elapsed time from the start of the control corresponds to the prohibition time TA. Further, when the control to prohibit charge from the external power source 50 is performed on the external power source control device 25, an elapsed time from the start of the control corresponds to the prohibition time TA.

The predetermined threshold value YA is set according to the time required from when the rotating electric machine 12 and the external power source 50, which are the power supply sources, receive a command to prohibit power supply to when power supply is actually stopped. For example, it is set according to a time from when a command to stop the power generation by the rotating electric machine 12 is performed is performed to when the rotation of the rotating electric machine 12 actually stops so that power generation is stopped.

When TA≥YA in step S206, the process proceeds to step S207, in which the current detection range is set to the "narrow range", and then the process proceeds to step S209. When TA<YA in step S206, the process proceeds to step S208, in which the current detection range is set to the "wide range", and then the process proceeds to step S209. The battery current value IB is detected in step S209 within the current detection range set according to the prohibition time TA.

As described above, according to the second embodiment, when the prohibition time TA is smaller than the predetermined threshold value YA, that is, before the elapse of the time from the command to prohibit power generation is issued to the rotating electric machine 12 and the like to when the power generation can be actually stopped, the current detection range is set to the "wide range". When the prohibition time TA is larger than the predetermined threshold value YA, that is, after the elapse of the time from the command to prohibit power generation is issued to the rotating electric machine 12 and the like to when the power generation can be actually stopped, the current detection range is set to the "narrow range". As a result, the battery current value IB can be detected within an appropriate current detection range according to the change in battery current value IB associated with the power supply prohibition command. In particular, after the power supply source shifts to the power supply prohibited state, the battery current value IB can be detected in the "narrow range" with a smaller influence of the offset error in the current detection. As a result, it is possible to suppress improper control of the on/off state of the switch 15 due to the offset error.

Third Embodiment

Figure 4:
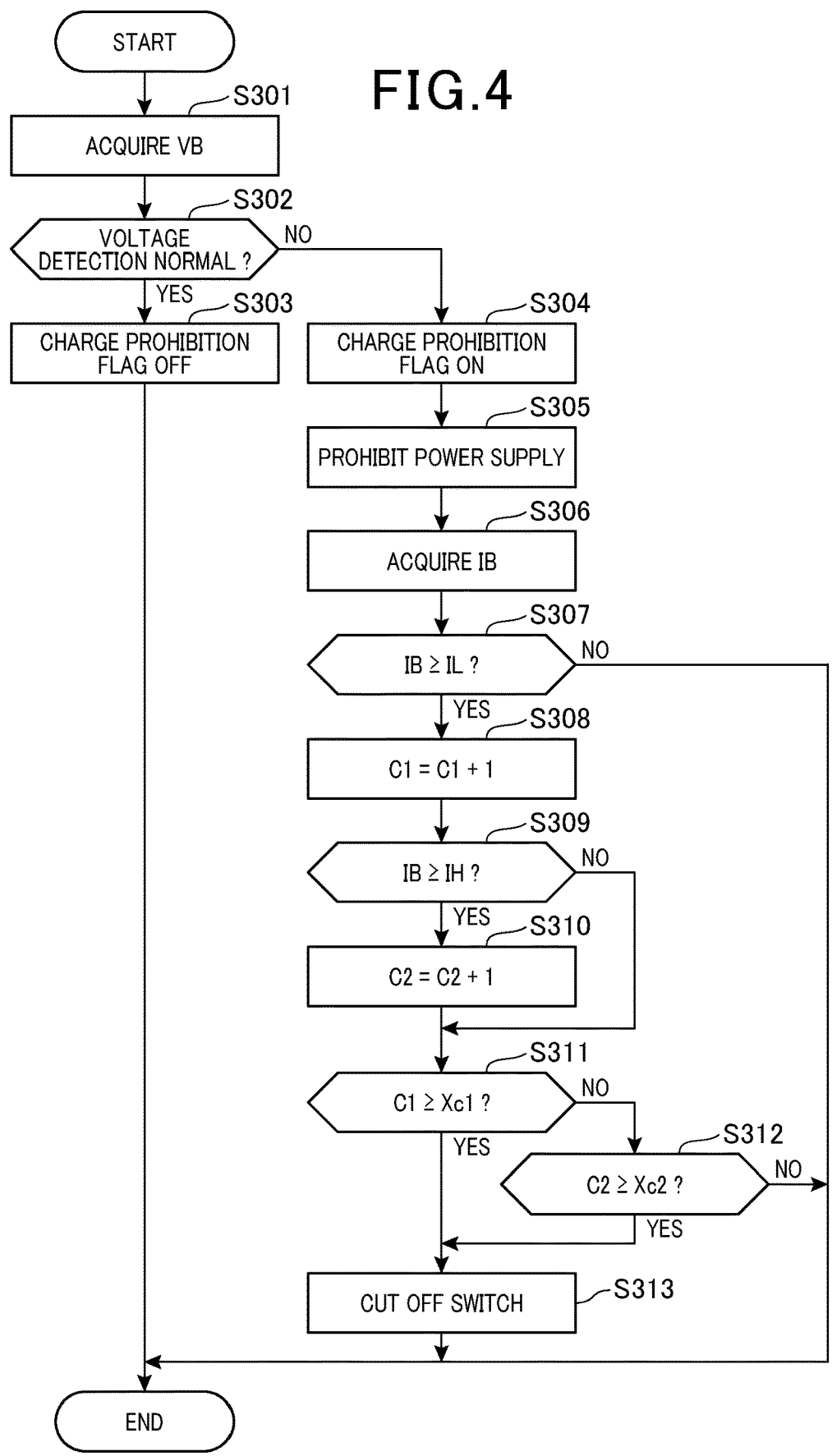
FIG. 4 is a flowchart of vehicle driving control according to a third embodiment.

FIG. 4 is a flowchart of vehicle driving control according to a third embodiment. The processing related to this flowchart is repeatedly performed at a predetermined cycle. In FIG. 4, determination related to cutoff of the switch 15 is performed by using two current threshold values IL and IH and counter values C1 and C2. Since the processing in steps S301 to S306 and S313 is the same as that in steps S101 to S106 and S108 shown in FIG. 2, the description thereof will be omitted.

In step S307, it is determined whether the battery current value IB acquired in step S306 is equal to or larger than the first current threshold value IL. When IB≥IL, the process proceeds to step S308. In step S308, the first counter value C1 is incremented by 1. An initial value of the first counter value C1 is zero. Then, the process proceeds to step S309. When IB<IL, the process ends.

In step S309, it is determined whether the battery current value IB acquired in step S306 is equal to or larger than the second current threshold value IH. The second current threshold IH is a value larger than the first current threshold IL (IH>IL). When IB≥IH, the process proceeds to step S310. In step S310, the first counter value C2 is incremented by 2. An initial value of the second counter value C2 is zero. Then, the process proceeds to step S311. When IB<IH, the process proceeds from step S309 to step S311.

In step S311, it is determined whether the first counter value C1 is equal to or larger than the first determination time Xc1. When C1≥Xc1, the process proceeds to step S313, in which the switch 15 is cut off by the same processing as in step S108, and the process ends.

When C1<Xc1, the process proceeds to step S312, in which it is determined whether the second counter value C2 is equal to or larger than the second determination time Xc2. When C2≥Xc2, the process proceeds to step S313, in which the switch 15 is cut off, and the process ends. When C2<Xc2, the process ends.

Figure 5:
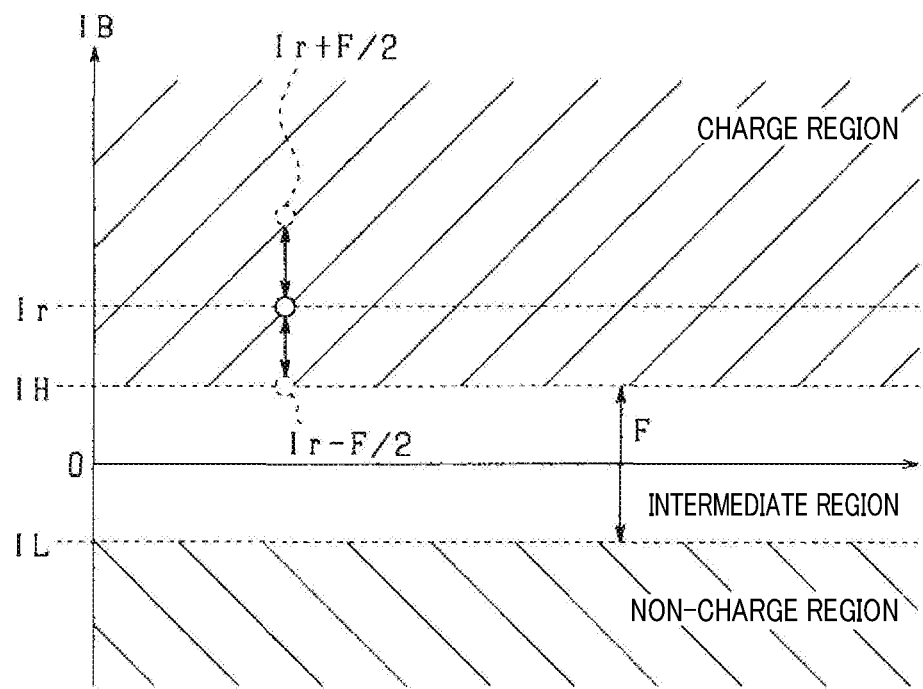
FIG. 5 is a diagram for explaining a first current threshold value and a second current threshold value according to the third embodiment.

As shown in FIG. 5, the first current threshold value IL and the second current threshold value IH are set so that the actual current is a value of zero in consideration of an offset error F of the current detection system. Specifically, the first current threshold value IL and the second current threshold value IH are set so that IH=−IL and that F=IH−IL. That is, they are set so that IH=F/2 and that IL=−F/2.

A region where IB≥IH is a charge region. When the battery current value IB is a value within the charge region, it can be decisively determined that power is supplied to the battery 11 even in consideration of the offset error F. Therefore, when IB≥IH, the second counter value C2 is incremented. Then, when the second counter value C2 becomes equal to or larger than the second determination time Xc2, the switch 15 is cut off.

A region where IB<IL is a non-charge region. When the battery current value IB is a value within the non-charge region, it can be decisively determined that power is not supplied to the battery 11 even in consideration of the offset error F. Therefore, it is not necessary to cut off the switch 15, and neither of the counter values C1 and C2 is incremented.

A region where IL≤IB<IH is an intermediate region. When the battery current value IB is a value within the intermediate region, it cannot be decisively determined whether power is supplied to the battery 11. Therefore, when IL≤IB<IH, the first counter value C1 is incremented. Then, when the first counter value C1 becomes equal to or larger than the first determination time Xc1, the switch 15 is cut off.

The first determination time Xc1 is set to be longer than the second determination time Xc2. The determination times Xc1 and Xc2 are set to values at which the switch 15 can be cut off so that the allowable capacity W of the battery 11 is not exceeded. More specifically, the determination times Xc1 and Xc2 are calculated based on the above formula (1).

When the actual current is Ir, a minimum value of the detected current is Ir−F/2 and a maximum value thereof is Ir+F/2 due to the offset error F. As shown in FIG. 5, when the actual current Ir is a value within the charge region, the detected battery current value IB is detected as a value within the intermediate region or the charge region.

When the detected battery current value IB is a value within the intermediate region, only the first counter value C1 is incremented, and, when the first counter value C1 exceeds the relatively long first determination time Xc1, the switch 15 is cut off. Although the actual current Ir is a value within the charge region, it is determined whether to cut off the switch 15, based on the relatively long first determination time Xc1.

In consideration of such a case, an assumed maximum current Imax1 related to the first current threshold value IL is set to a value larger than the second current threshold IH by F/2. That is, the assumed maximum current Imax1 is set to Imax1=IH+F/2. When the detected battery current value IB is a value within the intermediate region, the actual current Ir does not exceed (IH+F/2). Therefore, the first determination time Xc1 can be calculated as the determination time calculated by substituting Imax=Imax1=(IH+F/2) in the above formula (1). That is, it can be calculated from Xc1=W/(IH+F/2).

On the other hand, the second determination time Xc2 is calculated by substituting Imax=Imax2 in the above formula (1) using a maximum current value Imax2 that can be generated by the power supply source.

Figure 6:
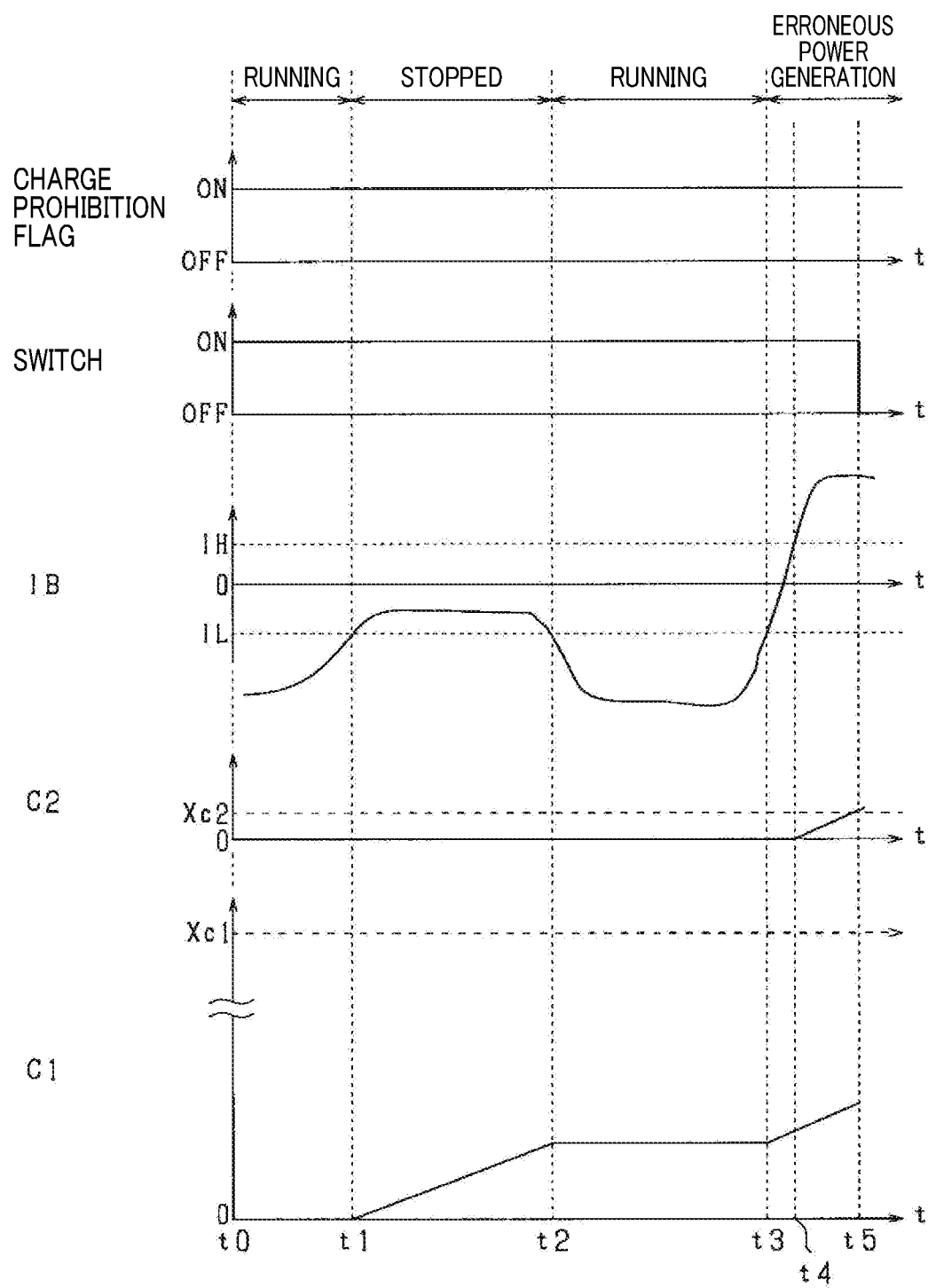
FIG. 6 is a time chart of the vehicle driving control according to the third embodiment.

FIG. 6 is a time chart when the ECU 30 performs the vehicle driving control according to the third embodiment, and shows a state after it is determined that there is an abnormality in voltage detection. The horizontal axis is a time t, and the vertical axis is a state of the charge prohibition flag, a state of the switch 15, the battery current value IB, the second counter value C2, and the first counter value C1 in order from the top in FIG. 6.

Throughout the time shown in FIG. 6, it is determined that there is an abnormality in voltage detection, and the charge prohibition flag is kept on. Since the charge prohibition flag is on, the vehicle is controlled to be in the fail-safe running state. The switch 15 is off.

In a period from a time t0 to a time t1, the vehicle gradually decelerates from the state of running by the power supplied from the battery 11, and stops. Therefore, the battery current value IB shows a negative value and gradually changes in a direction approaching zero. That is, the power supplied from the battery 11 to the rotating electric machine 12 is reduced.

At the time t1, the battery current value IB is equal to or larger than the first current threshold value IL, and thus the incrementing of the first counter value C1 is started. In a period from the time t1 to a time t2, the vehicle is in a stopped state, and the battery current value IB is a value equal to or more than the first current threshold value IL and not more than zero, and is substantially constant. In a period from the time t1 to the time t2, the first counter value C1 is periodically incremented, and the first counter value C1 gradually increases.

When the vehicle restarts running at the time t2, the power supplied from the battery 11 to the rotating electric machine 12 increases, and the value of the battery current value IB increases in the negative direction. In a period from the time t2 to a time t3, the vehicle is in a running state, and the power supplied from the battery 11 to the rotating electric machine 12 is substantially constant. That is, the battery current value IB is a value lower than the first current threshold value IL and substantially constant. During this period, the incrementing of the first counter value C1 is stopped, and the first counter value C1 becomes a substantially constant value.

If erroneous power generation occurs in the rotating electric machine 12 during the fail-safe running in the period from the time t2 to the time t3, the battery current value IB rises. At the time t3, the battery current value IB is equal to or larger than the first current threshold value IL, and thus the incrementing of the first counter value C1 is started. The battery current value IB further rises and becomes equal to or larger than the second current threshold value IH at a time t4. Therefore, the incrementing of the second counter value C2 is started. Thereafter, at a time t5, the second counter value C2 becomes equal to or larger than the second determination time Xc2. As a result, the switch 15 is cut off, and changes from the on state to the off state.

As described above, according to the third embodiment, the two current threshold values IL and IH, the corresponding determination times Xc1 and Xc2, and the two counter values C1 and C2 are used, thereby making it possible to determine whether to cutoff the switch 15 in consideration of the offset error F of the current detection system. As a result, the switch 15 can be cut off at an appropriate timing even when the offset error F with respect to the battery current value IB is not corrected.

Other Embodiments

Figure 7:
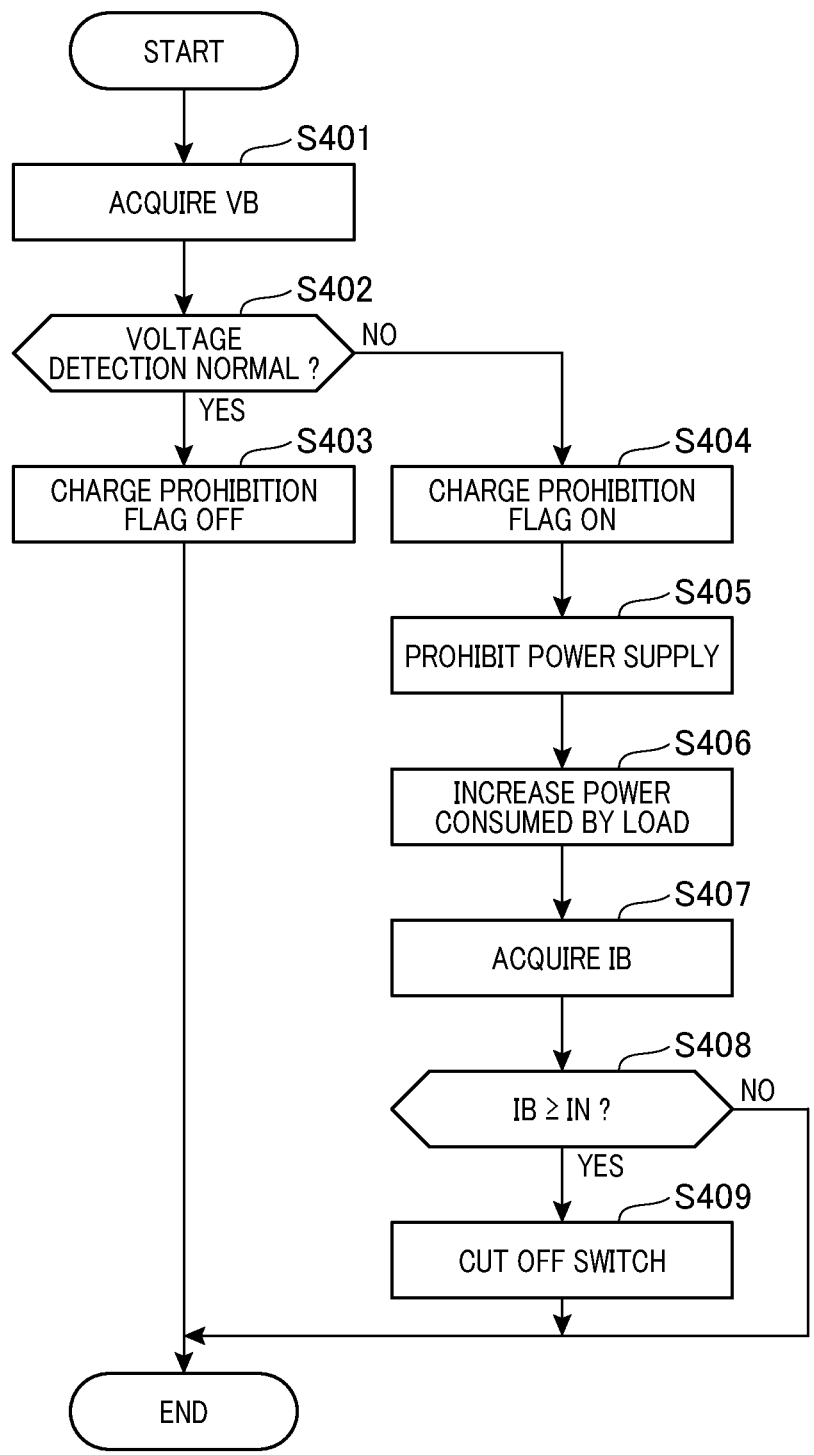
FIG. 7 is a flowchart of vehicle driving control according to another embodiment.

Modifications of the above embodiments will be described with reference to FIGS. 7 to 9. In each of the above embodiments, for example, during the power supply inhibition state of the power supply source, processing of increasing the power consumed by loads may be performed, as shown in FIG. 7, to reduce the power supply to the battery 11. The flowchart shown in FIG. 7 differs from that in FIG. 2 in that processing related to step S406 is added. In step S405, after the power supply prohibition processing is performed, the process proceeds to step S406, in which processing of increasing the power consumption at the loads is performed. The loads include a high-voltage load such as the rotating electric machine 12 and electrical auxiliary machines such as the converter 18 and the low-voltage loads 20 and 21. Since the processing in steps S401 to S405 and S407 to S409 is the same as that in steps S101 to S108 shown in FIG. 2, the description thereof will be omitted.

By performing the processing in step S406 to reduce the power supply to the battery 11, the increase in battery current value IB is suppressed, and the time until the battery current value IB exceeds the current threshold value (for example, IN, IL, or IH) is prolonged. As a result, the time until the switch 15 is cut off becomes longer, and the distance at which the vehicle can run fail-safely can be increased.

In the above, the driving system 10 for an EV vehicle shown in FIG. 1 has been illustrated and described, but the present disclosure is not limited thereto. The technique related to the driving system and the driving control device described above can also be applied to a hybrid vehicle (HV vehicle).

Figure 8:
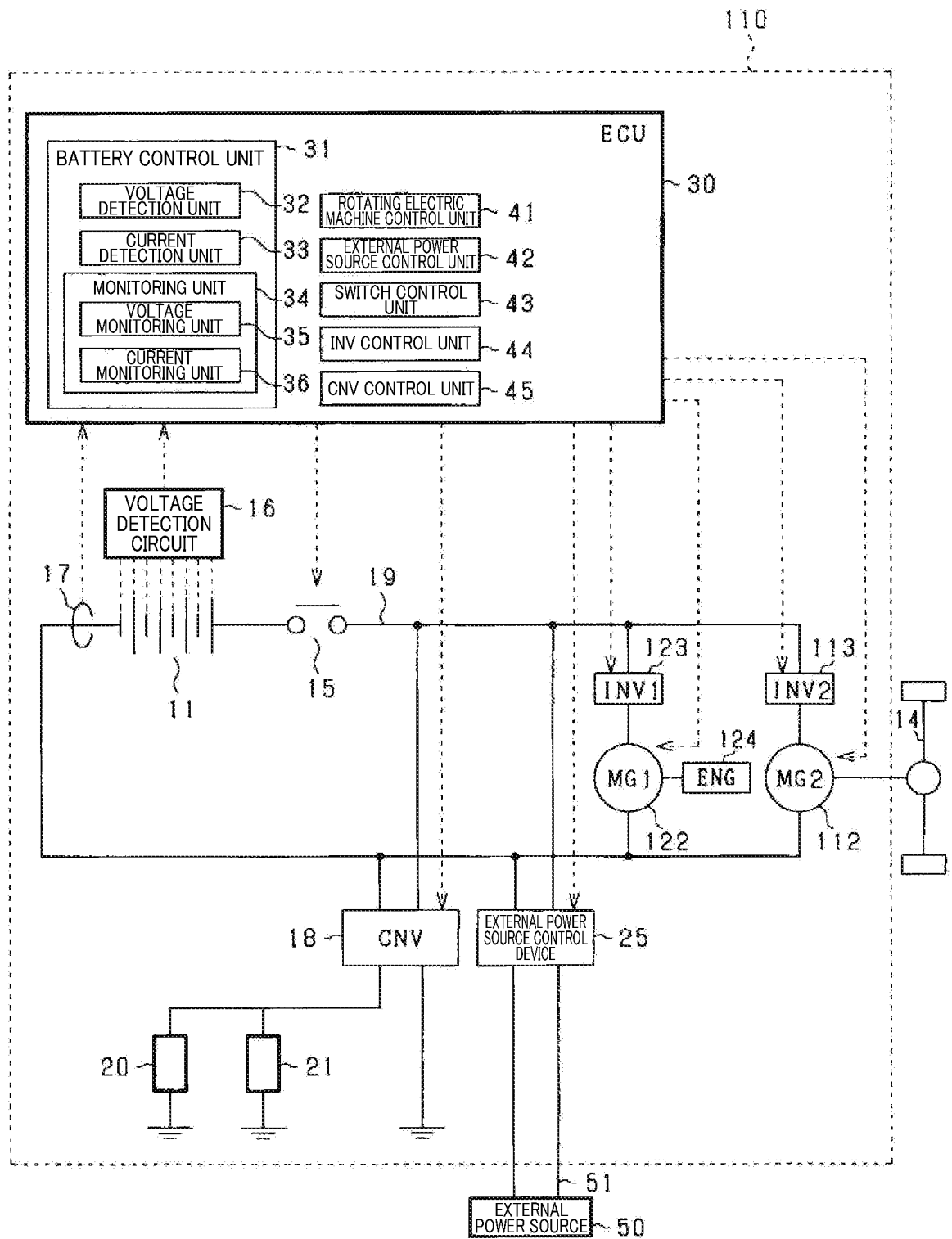
FIG. 8 is a diagram showing a driving system for a vehicle according to another embodiment.

A driving system 110 shown in FIG. 8 differs from that shown in FIG. 1 in that, in addition to the rotating electric machine 112 for driving the vehicle and the inverter 113 which are the same as those of the driving system 10 shown in FIG. 1, the driving system 110 further includes a rotating electric machine 122, an inverter 123, and an internal combustion engine 124. Since other configurations are substantially the same as those of the driving system 10, the description thereof will be omitted.

The vehicle runs by supplying power to the rotating electric machine 112 and driving the wheels 14. By driving the engine 124, the rotating electric machine 122 can be regeneratively operated to obtain generated power. The generated power of the rotating electric machine 122 is supplied to the battery 11, the rotating electric machine 122, and the like via the inverter 123. The power charged in the battery 11 or the power generated by the rotating electric machine 122 can be used to drive the rotating electric machine 122 and to run the vehicle.

In a system including a plurality of rotating electric machines 112 and 122 like the driving system 110, the rotating electric machine control unit 41 that functions as a power supply control unit may be configured to control the plurality of rotating electric machines 112 and 122 in such a manner that, when the power supply from the power supply source to the battery 11 is prohibited, a sum W1 of generated power, which is a total sum of the power generated by the plurality of rotating electric machines 112 and 122, does not exceed a sum W2 of consumed power, which is a total sum of the power consumed by the plurality of rotating electric machines 112 and 122. Specifically, for example, in the power supply prohibition processing shown in step S105 of FIG. 2, the ECU 30 may be configured to periodically perform processing as shown in FIG. 9.

Figure 9:
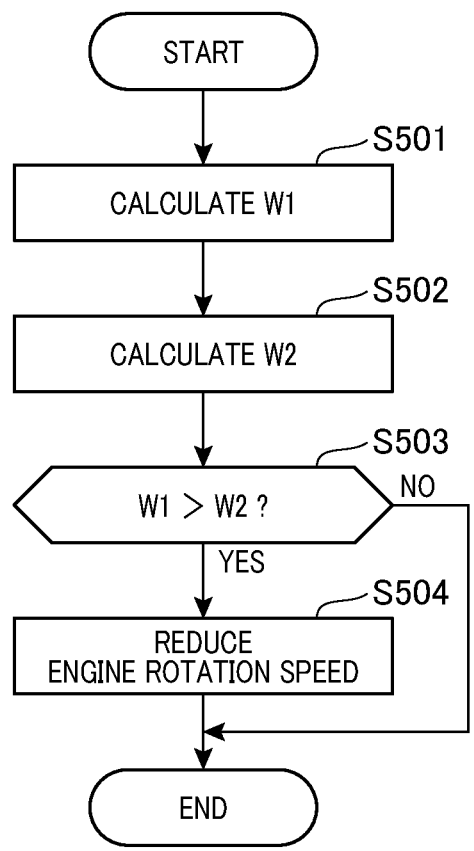
FIG. 9 is a flowchart of vehicle driving control according to another embodiment.

In FIG. 9, first, in step S501, the sum W1 of generated power, which is the total sum of the power generated by the rotating electric machines 112 and 122, is calculated, and then, in step S502, the sum W2 of consumed power, which is the total sum of the power consumed by the rotating electric machines 112 and 122, is calculated. Next, in step S503, it is determined whether the sum W1 of generated power exceeds the sum W2 of consumed power. When W1>W2, the process proceeds to step S504, in which the rotation speed of the engine 124 is reduced, the power generated in the rotating electric machine 122 is reduced, and the process ends. When W1≤W2, the process ends. According to the ECU 30, the power can be set not to be supplied from the rotating electric machines 112 and 122 to the battery 11 by controlling the rotation speed of the engine 124 and controlling W1 and W2 in such a manner that W1 does not exceed W2 through the processing shown in FIG. 9.

Although the processing of reducing the rotational speed of the engine 124 has been illustrated as the processing in step S504, the processing is not limited thereto. Any processing may be employed as long as it is processing of reducing W1 or increasing W2. Further, the ECU 30 may be configured to control the sum of power supplied from the power supply source so as not to exceed the sum of consumed power in the entire driving system 110. Specifically, for example, a total sum of the power generated by the rotating electric machines 112 and 122 and the charge power from the external power source 50 is calculated as a sum W3 of supplied power. Further, a total sum of power consumed by the rotating electric machines 112 and 122, the converter 18, the low voltage loads 20 and 21, the external power source control device 25, and the like is calculated as a sum W4 of consumed power. Then, the configurations on the power supply side and the power consumption side may be controlled in such a manner that the sum W3 of supplied power does not exceed the sum W4 of consumed power.

According to the above embodiments, the following effects can be obtained.

The driving system 10, 110 includes: the battery 11; the rotating electric machine 12, 112 that drives the vehicle by power supplied from the battery; the switch 15 that switches an electrical connection state between the battery 11 and a power supply source for supplying power to the battery 11 (rotating electric machine 12, 112, 122 during a regenerative operation, or external power source 50) to a conductive state or a cutoff state; and the ECU 30.

The ECU 30 includes: the battery control unit 31 that controls the battery 11; the rotating electric machine control unit 41 that functions as the running control unit which controls a running state of the vehicle; the rotating electric machine control unit 41 and the external power source control unit 42 that function as the power supply control unit which controls the power supply source; and the switch control unit 43 that controls the switch 15.

The battery control unit 31 includes: the voltage detection unit 32 that acquires the voltage value of the battery 11 detected by the voltage detection circuit 16 as the battery voltage value VB; the current detection unit 33 that acquires the charge/discharge current value of the battery 11 detected by the current detection device 17 as the battery current value IB; and the monitoring unit 34. The monitoring unit 34 monitors the battery 11 based on the battery voltage value VB acquired by the voltage detection unit 32 and the battery current value IB acquired by the current detection unit 33. More specifically, the monitoring unit 34 includes the voltage monitoring unit 35 and the current monitoring unit 36. The voltage monitoring unit 35 determines an abnormality in battery voltage value VB. The current monitoring unit 36 determines that power is supplied to the battery 11 when the battery current value IB is equal to or larger than the predetermined current threshold value (corresponding to the case where the battery current value IB is on a charge side relative to the current threshold value).

The running control unit controls the rotating electric machine 12, 112 in such a manner that the vehicle is brought in a fail-safe running state when it is determined by the voltage monitoring unit 35 that the voltage detection is abnormal, and the power supply control unit controls the power supply source to be brought in a state where the power supply to the battery 11 is prohibited. As a result, the vehicle can be run fail-safely in the state where the power supply to the battery 11 is prohibited.

Further, the switch control unit 43 cuts off the switch 15, in a case where it is determined by the current monitoring unit 36 that power is supplied to the battery 11, during the power supply prohibition state of the power supply source (when the power supply source is controlled by the power supply unit to be in a state where the power supply from the power supply source to the battery 11 is prohibited). The current monitoring unit 36 can detect a situation in which power is erroneously supplied to the battery 11 despite the fact that the power supply source is in the power supply prohibition state, and, in such a case, the switch 15 can be cut off. According to the ECU 30, it is possible to run the vehicle fail-safely while avoiding overcharging of the battery 11.

That is, the current monitoring unit 36 may be configured to determine that power is supplied to the battery 11 in a case where the time during which the battery current value IB is determined to be equal to or larger than the predetermined current threshold value becomes equal to or longer than the predetermined determination time, during the power supply prohibition state of the power supply source.

Further, the current monitoring unit 36 may determine whether power is supplied to the battery 11, based on the plurality of current threshold values and the plurality of determination times corresponding to the plurality of current threshold values. By using the plurality of current threshold values and the plurality of determination times, it is possible to determine whether to cut off the switch 15 in consideration of the offset error F of the current detection system. In the above embodiment, the case where the two current thresholds IL and IH and the two determination times Xc1 and Xc2 are used has been illustrated and described, but three or more current threshold values and three or more determination times corresponding to the current threshold values may be used.

Further, the current monitoring unit 36 may be configured to set a shorter corresponding determination time as the current threshold value is larger (corresponding to a value on a farther charge side). As the battery current value IB is larger (corresponding to a value on a farther charge side), the time required to reach the allowable capacity W of the battery 11 is shorter. Therefore, as the current threshold value is larger, the determination time is made shorter and the switch 15 is cut off earlier, so that overcharge can be suppressed more reliably.

The current detection unit 33 can change the current detection range of the battery current value IB, and the monitoring unit 34 may be configured to change the current detection range to a narrower range when it is determined that the power supply source has shifted to the power supply prohibition state. In the power supply prohibition state, the battery current value IB can be detected in a narrow current detection range, and the influence of the offset error F in the detection can be reduced. Further, the current monitoring unit 36 may be configured to determine that power is supplied to the battery 11 when the battery current value IB falls outside the current detection range after the current detection range is changed to a narrower range.

The current monitoring unit 36 may be configured to acquire a value obtained by correcting the offset error of the charge/discharge current value detected by the current detection unit 33 as the battery current value IB. It is possible to suppress improper cutoff of the switch 15 due to an offset error. In particular, when only one current threshold value is set, the correction of the offset error makes it possible to effectively suppress improper cutoff of the switch 15.

When the rotating electric machine that drives the vehicle is a generator motor capable of generating power, like the rotating electric machine 12, 112, 122 of the driving system 10, 110, this rotating electric machine can be used as the power supply source. In this case, the rotating electric machine control unit 41 may be configured to perform the control to prohibit the power generation of the generator motor during the power supply prohibition state of the power supply source. As another power supply source, the external power source 50 installed outside the vehicle and appropriately connected to the vehicle, like a charger in a charge stand, can be indicated. In this case, the external power source control unit 42 may control the external power source control device 25 so as to prohibit the power supply from the external power source 50 to the battery 11 during the power supply prohibition state of the power supply source.

When a system such as the driving system 110 includes the plurality of rotating electric machines 112 and 122, the rotating electric machine control unit 41 may be configured to control the plurality of rotating electric machines 112 and 122 in such a manner that, during the power supply prohibition state of the power supply source, the sum W1 of generated power, which is the total sum of the power generated by the plurality of rotating electric machines 112 and 122, does not exceed the sum W2 of consumed power, which is the total sum of the power consumed by the plurality of rotating electric machines 112 and 122.

The driving control device or driving system may include power consuming units (for example, the rotating electric machine 12, 112, 122, the converter 18, and the low-voltage loads 20 and 21) that can be in a state of consuming the power supplied from the battery 11 during the power supply prohibition state of the power supply source. The power consuming units are electrically connected to the battery 11 and can consume the power supplied from the battery 11. Even if erroneous power generation occurs during the fail-safe running of the vehicle, the generated power is consumed by the power consuming units, so that the rise in battery current value IB can be suppressed. As a result, it is possible to suppress the cutoff of the switch 15 while suppressing overcharge, and to lengthen the distance at which the vehicle can run fail-safely.

Although the present disclosure has been described in accordance with the examples, it is understood that the present disclosure is not limited to the examples and structures. The present disclosure also encompasses various modifications and variations within the range of equivalency. In addition, various combinations and configurations, and other combinations and configurations, including more, less or only a single element, also fall within the spirit and scope of the present disclosure.

What is claimed is:

1. A driving control device for controlling a driving system for a vehicle, the driving system comprising: a battery;
    a rotating electric machine that drives the vehicle by power supplied from the battery; and
    a switch that switches an electrical connection state between the battery and a power supply source that supplies power to the battery to a conductive state or a cutoff state,
    the battery control unit comprises:
    a battery control unit that controls the battery; a running control unit that controls a running state of the vehicle; a power supply control unit that controls the power supply source; and a switch control unit that controls the switch,
    wherein the battery control unit comprises:
    a voltage detection unit that acquires a voltage value of the battery as a battery voltage value;
    a current detection unit that acquires a charge/discharge current value of the battery as a battery current value;
    a monitoring unit comprising a voltage monitoring unit that determines an abnormality in voltage detection based on the battery voltage value and a current monitoring unit that determines that power is supplied to the battery when the battery current value is on a charge side relative to a predetermined current threshold value,
    the running control unit controls the rotating electric machine in such a manner that the vehicle is brought in a fail-safe running state when the voltage monitoring unit determines that the voltage detection is abnormal,
    the power supply control unit, when the voltage monitoring unit determines that the voltage detection is abnormal, controls the power supply source to be in a power supply prohibition state in which power supply to the battery is prohibited, and
    the switch control unit cuts off the switch, in a case where the current monitoring unit determines that power is supplied to the battery when the power supply source is controlled to be in the power supply prohibition state.

2. The driving control device according to claim 1, wherein the current monitoring unit determines that power is supplied to the battery, in a case where a time during which the battery current value is determined to be on a charge side relative to the current threshold value is equal to or longer than a predetermined determination time, when the power supply source is controlled to be in the power supply prohibition state.

3. The driving control device according to claim 2, wherein the current monitoring unit sets a plurality of the current threshold values and a plurality of the determination times corresponding to the plurality of current threshold values, and sets the corresponding determination time to be shorter as the current threshold value increases on the charge side.

4. The driving control device according to claim 1, wherein the current detection unit can change a current detection range of the battery current value, and when it is determined that the power supply source has shifted to the power supply prohibition state, the monitoring unit changes the current detection range to a narrower range.

5. The driving control device according to claim 4, wherein the current monitoring unit determines that power is supplied to the battery, in a case where the battery current value falls outside the current detection range after it is determined that the power supply source has shifted to the power supply prohibition state and the monitoring unit changes the current detection range to a narrower range.

6. The driving control device according to claim 1, wherein the driving system includes a power consuming unit that is electrically connected to the battery and can consume the power supplied from the battery, and the power consuming unit is in a state of consuming the power supplied from the battery when the power supply source is controlled to be in the power supply prohibition state.

7. The driving control device according to claim 6, wherein the power consuming unit includes the rotating electric machine.

8. The driving control device according to claim 6, wherein the power consuming unit includes an electrical auxiliary machine mounted on the vehicle.

9. The driving control device according to claim 8, wherein the electrical auxiliary machine is electrically connected to the battery via a converter mounted on the vehicle.

10. The driving control device according to claim 1, wherein the rotating electric machine is a generator motor capable of generating power, and the power supply control unit prohibits power generation of the generator motor when the power supply source is controlled to be in the power supply prohibition state.

11. The driving control device according to claim 1, wherein the driving system comprises a plurality of the rotating electric machines, the plurality of rotating electric machines include at least one rotating electric machine capable of generating power as the power supply source, and the power supply control unit controls the plurality of rotating electric machines in such a manner that, when the power supply source is controlled to be in the power supply prohibition state, a sum of generated power, which is a total sum of the power generated by the plurality of rotating electric machines, does not exceed a sum of consumed power, which is a total sum of the power consumed by the plurality of rotating electric machines.

12. The driving control device according to claim 1, wherein the current monitoring unit acquires, as the battery current value, a value corrected for an offset error of the charge/discharge current value detected by the current detection unit.

13. The driving control device according to claim 1, wherein the power supply source comprises an external power source connected to the vehicle, and the power supply control unit prohibits power supply from the external power source to the battery when the power supply source is controlled to be in the power supply prohibition state.

14. A driving system for a vehicle, comprising: a battery; a rotating electric machine that drives the vehicle by power supplied from the battery; and a switch that switches an electrical connection state between the battery and a power supply source that supplies power to the battery to a conductive state or a cutoff state, and a driving control device, the driving control device comprising: a battery control unit that controls the battery; a running control unit that controls a running state of the vehicle; a power supply control unit that controls the power supply source; and a switch control unit that controls the switch, wherein the battery control unit comprises:

a voltage detection unit that acquires a voltage value of the battery as a battery voltage value;

a current detection unit that acquires a charge/discharge current value of the battery as a battery current value;

a monitoring unit comprising a voltage monitoring unit that determines an abnormality in voltage detection based on the battery voltage value and a current monitoring unit that determines that power is supplied to the battery when the battery current value is on a charge side relative to a predetermined current threshold value, the running control unit controls the rotating electric machine in such a manner that the vehicle is brought in a fail-safe running state when the voltage monitoring unit determines that the voltage detection is abnormal, the power source control unit, when the voltage monitoring unit determines that the voltage detection is abnormal, controls the power supply source to a power supply prohibition state in which power supply to the battery is prohibited, and the switch control unit cuts off the switch, in a case where the current monitoring unit determines that power is supplied to the battery when the power supply source is controlled to be in the power supply prohibition state.

* * * * *